United States Patent [19]

Cato

[11] Patent Number: 4,971,110

[45] Date of Patent: Nov. 20, 1990

[54] FACE SEAL SHUT-OFF VALVE

[75] Inventor: Michael W. Cato, Newark, Calif.

[73] Assignee: Semi-Gas Systems, Inc., San Jose, Calif.

[21] Appl. No.: 453,407

[22] Filed: Dec. 19, 1989

[51] Int. Cl.[5] .............................................. F16L 29/00
[52] U.S. Cl. ............................... 137/614.04; 251/149.6
[58] Field of Search ......................... 251/149.4, 149.6; 137/614, 614.03, 614.04

[56] References Cited

U.S. PATENT DOCUMENTS 1,345,571  7/1920  Yates ................................ 137/614.04
2,931,668  4/1960  Baley ............................. 251/149.4 X
4,509,554  4/1985  Failla .......................... 137/614.04 X Primary Examiner—John C. Fox
Attorney, Agent, or Firm—Thomas E. Schatzel

[57] ABSTRACT

A first and second conduit are connected together by a screw thread attachment. A gasket hermetically seals the first and second conduit together. The first conduit has a seal member which is shaped to engage a sealing surface of the first conduit. Spring washers force the seal member against the sealing surface. The seal member has an extension which engages the gasket such that when the conduits are screwed togther, the seal member is lifted off of the sealing surface.

14 Claims, 2 Drawing Sheets

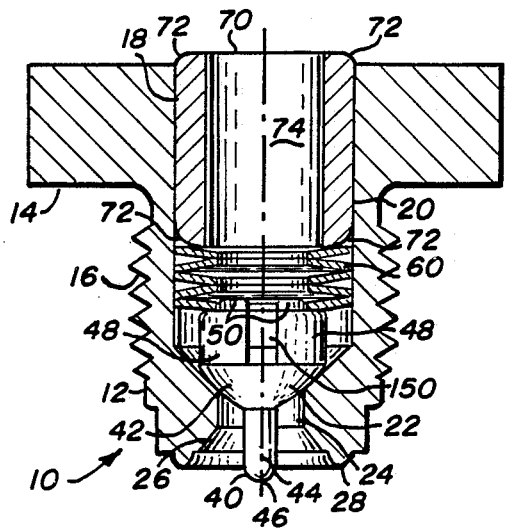
Fig_1
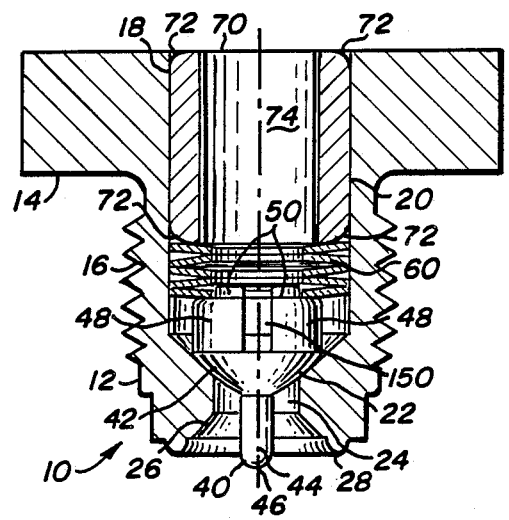
Fig_2
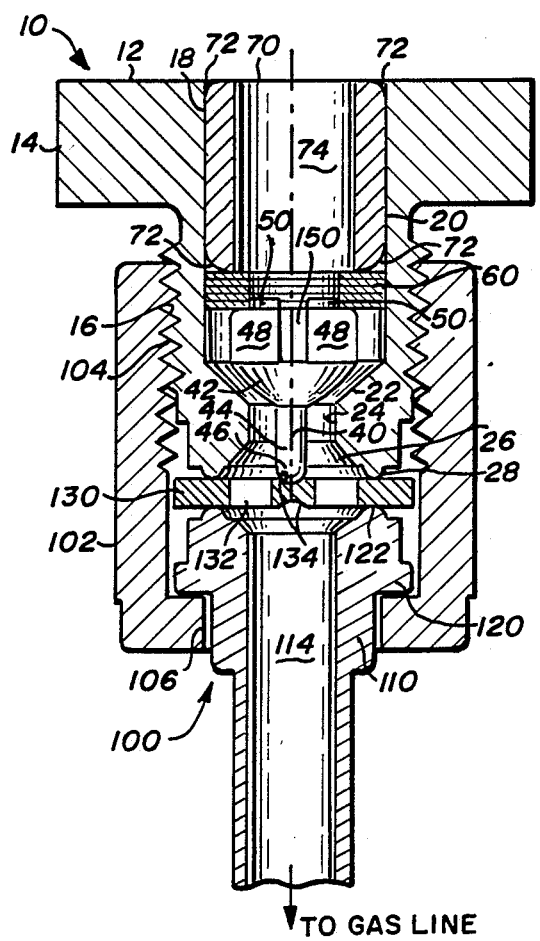
Fig_3
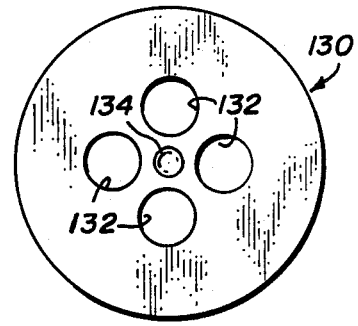
Fig_4
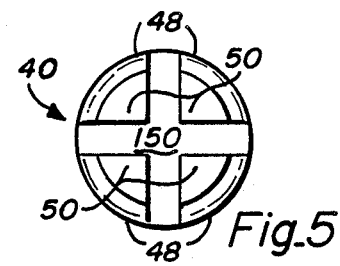
Fig_5
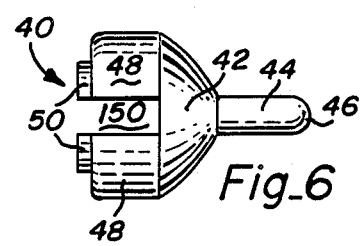
Fig_6
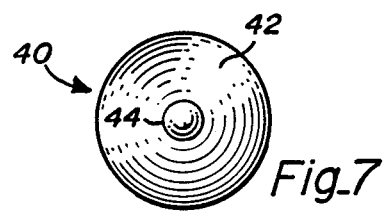
Fig_7

FACE SEAL SHUT-OFF VALVE

BACKGROUND OF THE INVENTION

1. Field of the Invention

This invention relates to face seal shut-off valves and more specifically to a face seal shut-off valve which is integral to a conduit connection.

2. Description of the Prior Art

Many industries, such as the semiconductor industry, require high purity gas in their processes. Impurities such as moisture and particles in the gas can cause defective products. In order to remove these impurities from the gas, various filters and purifiers are located along the gas lines.

The filters and purifiers have limited life spans and must be replaced periodically. These filters and purifiers have an inlet and outlet port connected to the gas line. Each inlet and outlet port has a separate connector and a separate manual shut-off valve. In order to remove and change a filter or purifier, the manual shut-off valves at each end are closed. This prevents atmospheric gas and contaminants from entering the gas line system. Additionally, some purifiers are damaged by exposure to the atmosphere. These purifiers are also isolated by means of valves prior to installation or removal. Thus, after the shut-off valves are closed, the connections on each side are then loosened and the filter or purifier is removed and replaced with a new one.

A problem with these prior art systems is that each of the valves and connectors have a relatively large volume inside which allows in atmospheric gases and other impurities during the replacement operation. Such volumes have surface areas associated with them that provide adhesion surfaces for contamination, particularly moisture. Thus, when the system is reactivated, these impurities are present in the system. There is a need to reduce these entrapment volumes in order to maintain the high purity level of the system.

SUMMARY OF THE PRESENT INVENTION

It is therefore an object of the present invention to provide a combination valve and connection assembly having a reduced entrapment volume, and in turn, reduced surface area.

Briefly, in a preferred embodiment, the present invention comprises a first tube member having a threaded portion and a second tube member having a threaded portion sized to mate with the first tube member. A disk-shaped gasket having a plurality of radially located holes is shaped to fit between the first and second tube member to form a seal.

The first tube member has a valve sealing surface inside. A seal member is shaped to fit against the valve sealing surface. The seal member has an extension tab which engages the gasket and forces the seal member away from the seal face when the first and second tube members are connected together. The seal member also has a plurality of flow slots which allow gas to flow around it when it is not in contact with the valve sealing surface. A number of spring washers are placed between the seal member and an annular ledge such that the seal member is forced securely against the seal face when the first and second tube members are not connected and the seal member is not engaging the gasket.

It is an advantage of the present invention in that it provides a combination valve and connection having a reduced entrapment area.

Another advantage of the present invention is that it provides a combination valve and connection assembly which is of relatively simple design, thereby providing economical assembly costs and automatic operation.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a cross-sectional view of a first valve section of a valve-connection assembly of the present invention;

FIG. 2 is a cross-sectional view of the first valve section of FIG. 1 with the springs in the loaded condition;

FIG. 3 is a cross-sectional view of the valve-connection assembly of the present invention;

FIG. 4 is an end view of a gasket of the present invention;

FIG. 5 is a top view of a poppet of the present invention;

FIG. 6 is a side view of a poppet of the present invention;

FIG. 7 is a bottom view of a poppet of the present invention; and

DETAILED DESCRIPTION OF THE PREFERRED EMBODIMENT

Figure 8:
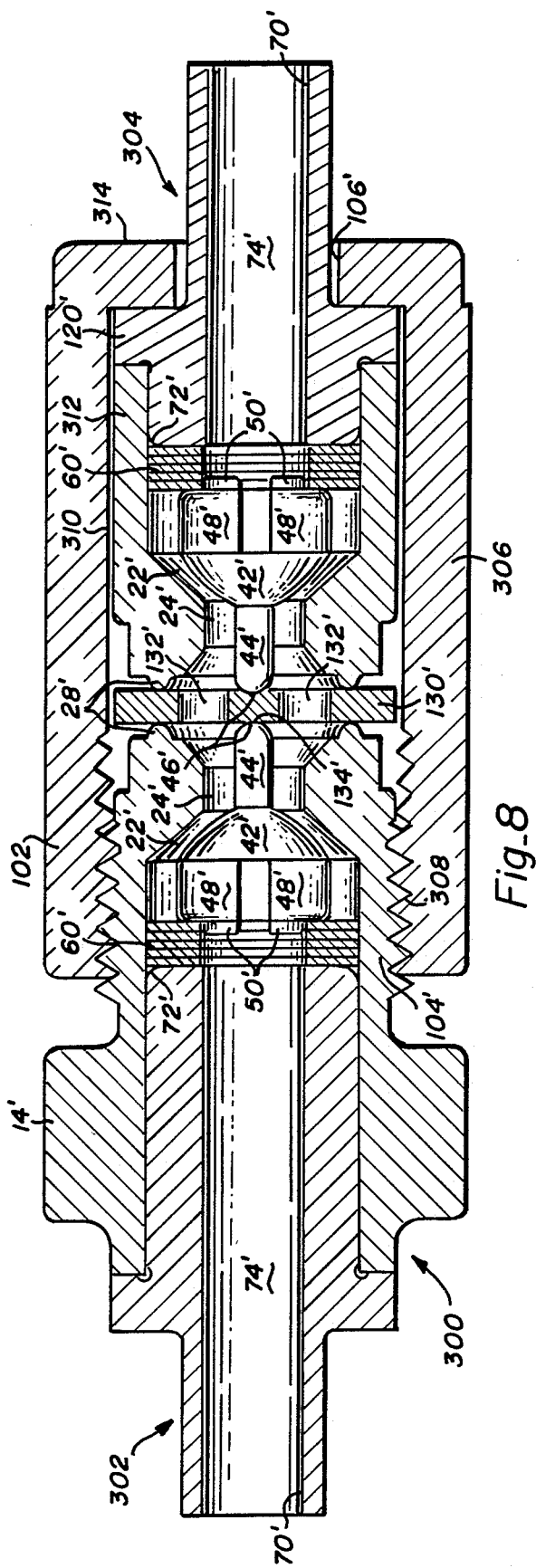
FIG. 8 is a side view of a dual-sided valve-connection assembly of the present invention.

FIG. 1 is a cross-sectional view of a first section of a valve-connection assembly of the present invention and designated by the general reference number 10. A stainless steel cylindrical housing 12 has a disk-shaped collar section 14. Housing 12 has a screw thread section 16. An internal passage 18 passes through housing 12. Internal passage 18 has a tube section 20, a reducing section 22, a restricted section 24, and an expansion section 26. The surface of the reducing section 22 is also known as the valve sealing surface. Housing 12 also has an integral torroidal ring 28 at the end of internal passage 18 around the exit of expansion section 26.

A stainless steel seal member 40, otherwise known as a poppet, is positioned within internal passage 18 such that it forms a seal with the valve sealing surface of reducing section 22. Poppet 40 has a rounded conical section 42 which is shaped to create a line seal when mating with the valve sealing surface 22 in housing 12. The conical seal section 42 is rounded to preclude jamming due to possible misalignment. A cylindrical extension section 44 protrudes through the restricted section 24 and the expansion section 26. Extension section 44 has a rounded tip 46. Poppet 40 also has four pie-shaped leg members 48 which extend upward from rounded conical section 42. Each of legs 48 has a pie-shaped tab member 50.

A plurality of stainless steel spring washers 60, otherwise known as Bellville springs, are positioned above poppet 40. In the preferred embodiment, five spring washers 60 are used. The spring washers 60 each have an outside diameter sized to fit within tube section 20 and an internal diameter sized to receive tabs 50 of poppet 40.

A stainless steel press-fit collar 70 is sized to fit snugly inside passage 18. The outside edges 72 of collar 70 are rounded. Edges 72 form an annular ledge which one of spring washers 60 rests against. Collar 70 has an internal passage 74. FIG. 1 shows valve 10 with the spring washers 60 in an uncompressed condition.

FIG. 2 shows a cross-sectional view of valve section 10 with the spring washers 60 in a partially compressed condition. Here the collar 70 has been press fit into passage 18, a distance such that it is flush with the top surface of housing 12. In this position, spring washers 60 exert approximately thirty-five pounds of force against poppet 40 and force the poppet 40 securely against the seal face of reducing section 22.

FIG. 3 is a cross-sectional view of the valve-connection assembly of the present invention and is designated by the general reference number 100. A stainless steel nut section 102 has an internal screw thread section 104 which mates with the screw thread section 16 of housing 12. Nut section 102 has a passage 106 which receives a stainless steel interface 110. Interface 110 has an internal tube section 114. Interface 110 has a flange section 120 which keeps interface 110 in its proper position within nut section 102. Interface 110 also has torroidal ring section 122. The ring section 122 corresponds in size and is aligned with ring section 28 of housing 12.

FIG. 4 shows an end view of a gasket 130. In the preferred embodiment, there are four flow apertures 132. There is a dimple 134 centrally located on each side of gasket 130.

The disk-shaped nickel gasket 130 is positioned between ring section 28 and ring section 122. The plurality of flow apertures 132 provide a flow path for gas. The central dimple 134 provides for receiving the rounded tip 46 of poppet 40. A tubular section 140 extends from the interface 110.

FIG. 5 shows a top view of poppet 40. In the preferred embodiment, there are four of the legs 48 which extend upward on poppet 40. Each leg 48 has one of the smaller pie-shaped tabs 50. The tabs 50 are sized to fit within the internal diameter of spring washers 60. The space between the legs 48 forms a cross-shaped flow passage 150.

FIG. 6 shows a side view of poppet 40 and FIG. 7 shows a bottom view of poppet 40.

FIG. 8 is a cross-sectional view of a dual-sided shut-off system 300, including two valve-connection assemblies connected in end-to-end relationship. The components of system 300 which are the same as the valve-connection assembly 700, carry the same reference numeral distinguished by a prime designation. The system 300 includes a male valve-connection assembly 302 and a female valve-connection assembly 304. The system 300 includes a stainless steel nut section 306 which has internal threads 308 for engaging the threads of internal screw thread section 104'. Nut section 306 has a smooth internal surfaced cylindrical section 310 which has an internal diameter greater than the outer diameter of an internal sleeve 312. The sleeve 312 is similar to the sleeve 104' except that the outer surface is smooth thereby allowing the sleeve 306 to slide over it. The sleeve 306 has an internal protruding shoulder 314 about the terminal end of the section 312. When assembled, the shoulder 314 abuts the flange section 120' of the valve-connector assembly 304.

In the dual-sided shut-off assembly 300, as the sleeve 306 is turned, it advances or retracts relative to the section 104' of the valve-connector assembly 302. Simultaneously, the shoulder 314 advances or retracts relative to the sleeve 312. Thus, the valve-connectors 302 and 304 open and close simultaneously dependent upon rotation of section 102.

Figure 9:
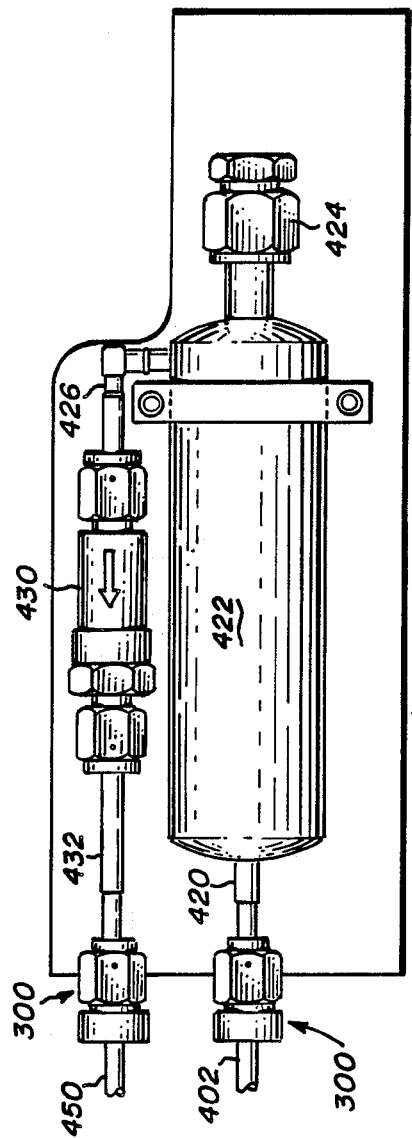
FIG. 9 is a side view of a system using two of the valve-connection assemblies of the present invention.

FIG. 9 shows a gas purifier and filter system and is designated by the general reference number 400. System 400 has a gas inlet line 402. Line 402 is welded to valve-connection assembly 300. Assembly 300 is connected to a purifier inlet tube 420 tied to a purifier 422. Purifier 422 is a canister which is filled with a purifying resin through a fill port 424. The purifier resin may be Nanochem resin.

Purifier 422 is connected to a purifier outlet tube 426. The tube 426 is connected to a filter 430. Filter 430 is connected to a filter outlet line 432. Filter outlet line 432 is connected to another valve-connection assembly 300 which is connected to a gas outlet line 450.

The advantages of the present invention may now be understood. Once the valve housing 12 has been assembled with collar 72 press fitted in proper position, the spring washers 60 are preloaded as shown in FIG. 2. The spring washers 60 exert thirty-five pounds of force against poppet 40 and force it against the valve sealing surface of reducing section 22 to form a seal. Gas flowing through passage 18 is shut-off.

When nut section 102 is screwed onto housing 12 a number of things happen. Gasket 130 is pressed between torroidal ring 28 and torroidal ring 122 forming a face seal. At the same time, the tip 46 of poppet 40 engages the crater 134 of gasket 130. The poppet 40 is forced upward and away from reducing section 26. Gas may now flow freely through passage 74 through the inside diameter of spring washers 60, through flow passage 150 of poppet 40 and then around poppet 40. The gas continues to flow through restricted secton 24, expansion section 26, through the flow apertures 132 of gasket 130, through reducing section 112 and tube section 114 and finally out through pipe 140. Thus, valve 100 automatically closes when housing 12 and nut section 102 are disconnected and automatically opens when the connection between housing 12 and nut section 102 is made. Because travel of poppet 40 is small, only approximately one turn of nut 102 is required to open or close the valve.

The present invention is ideal for use in high purity gas systems. In system 200 of FIG. 8, a combination purifier 222 and filter 230 is connected to a gas inlet 202 and outlet 250 via two valve-connection assemblies 100 of the present invention. When the purifier 222 and filter 230 need replacement, the nut sections of both valves are loosened and the purifier 222 and filter 230 are removed. The valve-connection assemblies 100 automatically shut to prevent atmospheric contamination from entering the gas system. When the new filter and purifier are screwed into place, the valve-connection assemblies 100 are automatically opened. Prior art systems use separate manual shut-off valves and connectors. This increases the entrapment space and allows more contaminants to enter the system.

Another advantage of the present invention is that it increases safety relative to the prior art. In the prior art systems, if an operator forgets to completely shut-off the manual valves before loosening the connections, the operator may get a blast of gas, sometimes toxic, in his or her face. With the present invention, this risk is overcome because it automatically shuts off the gas flow as soon as the nut section is loosened.

The present invention has additional features which help reduce contamination of the system. When the housing 12 and nut section 102 are fully connected, spring washers 60 are completely deflected. There is no space left between each of the spring washers 60. This prevents impurities such as moisture from collecting and contaminating the system.

The collar 70 has rounded edges 72. When spring washers 60 deflect, as in FIG. 2, they pivot or roll along rounded edge 72. This results in much less wear between edge 72 and washer spring 60. The reduced friction results in greatly reducing the amount of metal particles which are introduced into the gas system.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A shut-off valve, comprising:
   a first connection interface having a first conduit;
   a second connection interface having a second conduit, the second connection interface for connecting and forming a seal with the first connection interface; and
   a valve seal means for shutting off a flow of fluid through said first conduit when the first and second connection interfaces are not connected together, the valve seal means comprises (1) a sealing member located within said first conduit and sized to form a seal with a sealing surface, and (2) a biasing means connected to said first conduit and said seal member for forcing said seal member against said seal surface when the first and second connection interfaces are not connected, said biasing means comprises at least one spring washer.

2. The device of claim 1, wherein:
   the first connection interface has a rounded edge abutting said spring washer for allowing a surface of said spring washer to roll across said rounded edge as said spring washer deflects.

3. The device of claim 1, wherein:
   said spring washer is fully deflected when the first and second connection interfaces are connected.

4. The device of claim 1, wherein:
   said sealing member is sized to mate with an internal diameter of said spring washer.

5. The device of claim 4, wherein:
   said sealing member has a flow passage to allow said fluid to flow through said sealing member and through the internal diameter of said spring washer when said sealing member is not in contact with said sealing surface.

6. The device of claim 1, further including:
   a gasket member sized to fit between the first connection interface and the second connection interface to hermetically seal said first conduit to said second conduit.

7. A shut-off valve, comprising:
   a first conduit;
   a second conduit;
   an attachment means connected to the first conduit and the second conduit for connecting the first and second conduits together;
   a sealing surface located within the first conduit;
   a gasket sized to fit between the first and second conduits to form a seal when the attachment means connects the first and second conduits together;
   a sealing member sized to engage the sealing surface and having an extension section which protrudes a distance from said sealing member to engage the gasket when the attachment means connects the first and second conduits together; and
   a biasing means connected to the first conduit and the sealing member to force the sealing member against the sealing surface when said extension member is not engaging the gasket, said biasing means comprises at least one spring washer.

8. The device of claim 7, wherein:
   the attachment means comprises a first thread screw section located on the first conduit and a second screw thread section located on the second conduit.

9. The device of claim 7, wherein:
   the first conduit has a rounded edge abutting said spring washer for allowing a surface of said spring washer to roll across said rounded edge as said spring washer deflects.

10. The device of claim 7, wherein:
    said spring washer is fully deflected when the first and second conduits are connected by the attachment means.

11. The device of claim 7, wherein:
    the sealing member has at least one tab section sized to mate with an internal diameter of said spring washer.

12. The device of claim 11, wherein:
    the sealing member has a flow passage to allow a flow of fluid to pass through the sealing member and through said internal diameter of said spring washer when the sealing member is not engaging the sealing surface.

13. A shut-off valve, comprising:
    a first conduit;
    a second conduit;
    attachment means connected to the first conduit and second conduits for connecting the first and second conduits together;
    a first sealing surface located within the first conduit;
    a second sealing surface located within the second conduit;
    a gasket sized to fit between the first and second conduits to form a seal when the attachment means connects the first and second conduits together;
    a first sealing member sized to engage the first sealing surface and having an extension section which protrudes a distance from said first seal member to engage the gasket when the attachment means connects the first and second conduits together;
    a second sealing member sized to engage the second sealing surface and having an extension section which protrudes a distance from said second seal member to engage the gasket when the attachment means connects the first and second conduits together;
    a first biasing means connected to the first conduit and the first sealing member to force the first sealing member against the first sealing surface when said extension section is not engaging the gasket, said first biasing means comprises at least one spring washer; and a second biasing means connected to the second conduit and the second sealing member to force the second sealing member against the second sealing surface when said extension section is not engaging the gasket, said second biasing means comprises at least one spring washer.

14. The device of claim 13, wherein:

the attachment means comprises (1) a first thread screw section engaging a mating thread screw section on the first conduit, and (2) a shoulder abutting the second conduit.

* * * * *